United States Patent [19]

Honda et al.

[11] Patent Number: 5,144,290
[45] Date of Patent: Sep. 1, 1992

[54] DISPLAY UNIT ATTACHMENT DEVICE

[75] Inventors: Masami Honda, Ome; Youji Sato, Tokyo, both of Japan

[73] Assignee: Kabushiki Kaisha Toshiba, Kawasaki, Japan

[21] Appl. No.: 428,772

[22] Filed: Oct. 30, 1989

[30] Foreign Application Priority Data

Oct. 31, 1988 [JP] Japan .............................. 63-142297[U]

[51] Int. Cl.⁵ .............................................. B09G 3/02
[52] U.S. Cl. .................................. 340/711; 364/708; 248/917
[58] Field of Search .................. 248/917; 16/337, 341; 340/711; 403/146; 267/155; 364/708

[56] References Cited

U.S. PATENT DOCUMENTS

| | | | |
|---|---|---|---|
| 4,438,458 | 3/1984 | Münscher | 248/917 |
| 4,571,456 | 2/1986 | Paulsen et al. | |
| 4,620,344 | 11/1986 | Lewis, Jr. | 16/337 |
| 4,624,434 | 11/1986 | Lake, Jr. et al. | 403/146 |
| 4,697,673 | 10/1987 | Omata | 267/155 |
| 4,730,364 | 3/1988 | Tat-Kee | 16/337 |
| 4,749,364 | 6/1988 | Arney et al. | 439/372 |
| 4,781,422 | 11/1988 | Kimble | 16/337 |
| 4,808,017 | 2/1989 | Sherman et al. | 340/711 |
| 4,895,231 | 1/1990 | Yamaguchi et al. | 364/708 |
| 4,978,949 | 12/1990 | Herron et al. | 364/708 |

FOREIGN PATENT DOCUMENTS 59-99111 6/1984 Japan .

OTHER PUBLICATIONS

IBM Technical Disclosure Bulletin vol. 29, No. 10, Mar. 1987 Removable Liquid Crystal Display For a Personal Computer pp. 4273-4274.

Primary Examiner—Alvin E. Oberley
Assistant Examiner—Luu, Matthew
Attorney, Agent, or Firm—Cushman, Darby & Cushman

[57] ABSTRACT

A portable apparatus comprises a base body having a front portion provided with a keyboard and a rear portion, a display unit having a display, a socket for allowing the display unit to be detachable with the base body and for mechanically rotatably connecting the display unit between the first position where the display unit covers the keyboard and the second position where allows an operation of the keyboard on watching the display, and a part for giving rotational force to the display unit when the display unit is connected to the base body and for forming the rear portion to be flat when the display unit is removed from the base body. The portable apparatus of the present invention allows the front phase of the socket to be set to the position opposing to the socket mount phase when the display unit is removed from the socket, it can avoid the socket to be in the way, and the operability and the portability of the apparatus can be improved.

5 Claims, 7 Drawing Sheets

DISPLAY UNIT ATTACHMENT DEVICE

BACKGROUND OF THE INVENTION

1. FIELD OF THE INVENTION

The present invention relates to a portable apparatus having a display unit which is detachably mounted in the base body, particularly, relates to a portable apparatus provided with a mechanism for releasing a rotation force acting to a socket for supporting rotatably the display when the display is removed.

2. DESCRIPTION OF THE RELATED ART

In recent years, portable computers, so called, "lap top type computers" equipped with a flat panel display unit rotatably mounted on the base body have been developed as disclosed, for example, in U.S. Pat. No. 4,571,456. The portable computer disclosed therein is provided with a latch assembly for setting the display unit in the position to cover keyboard on the base body. Further, this portable computer is equipped with a coil spring used for hopping up the display unit to a certain position when the latch is released.

As disclosed in U.S. Pat. No. 4,749,364, in the lap top type computers, there has been developed the portable computer equipped with the rotatable display unit which is detachably mounted on the base body. The display detachable type portable computer has the display unit which is capable of being mechanically connected to the base body by inserting a plug mounted on the display unit into a socket rotatably provide in the base body. Since the socket is rotatably provided in the base body, the display unit rotates on the base body. The mechanical connection of the display unit to the base body can be released by operating a release lever, thereby the display unit can be removed from the base body.

If the coil spring for hopping up the display unit disclosed in U.S. Pat. No. 4,571,456 will be utilized in the display detachable type portable computer, the force of the coil spring is added to the socket rotating on the base body. If the force for hopping up the display is added to the socket, the socket is required to be risen up all the time on the base body when the display unit is removed from the base body. The rising up of the socket caused by removing the display unit affects to the portability and the operability of the portable computer.

SUMMARY OF THE INVENTION

For solving the problems as mentioned above, the present invention aims at providing the portable apparatus which is the display detachable type, wherein the force for hopping up the display unit is given to the display unit, but not to the socket for supporting rotatably the display unit.

For achieving the object as mentioned above, the portable apparatus of the present invention is provided with a base body having a keyboard and a socket mount phase, a socket having a front phase and being formed rotatably in the base body, a display unit having a display and being mounted rotatably between the first position for covering the keyboard by engaging with the socket and the second position for allowing the keyboard operation on watching the display, and a lift means for lifting the display unit from the first position to the second position. The lift means allows a force for lifting up the display unit to the second position to be given to the display unit, but not to the socket. Therefore, the front phase of the socket can be set to the third position opposing to the socket mount phase when the display unit is removed from the socket.

Since the portable apparatus of the present invention allows the front phase of the socket to be set to the position opposing to the socket mount phase when the display unit is removed from the socket, it can avoid the socket to be in the way, and the operability and the portability of the apparatus can be improved.

DETAILED DESCRIPTION OF PREFERRED EMBODIMENT

Figure 1:
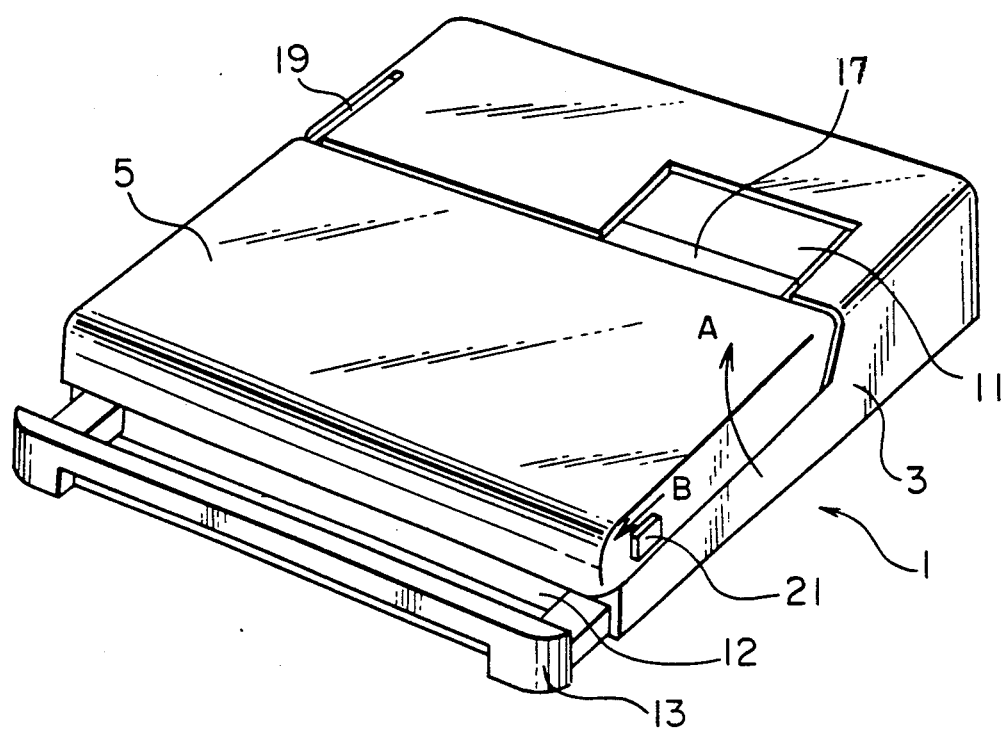
FIG. 1 is a perspective view showing a display unit of a portable computer set to the first position for covering a keyboard.
Figure 2:
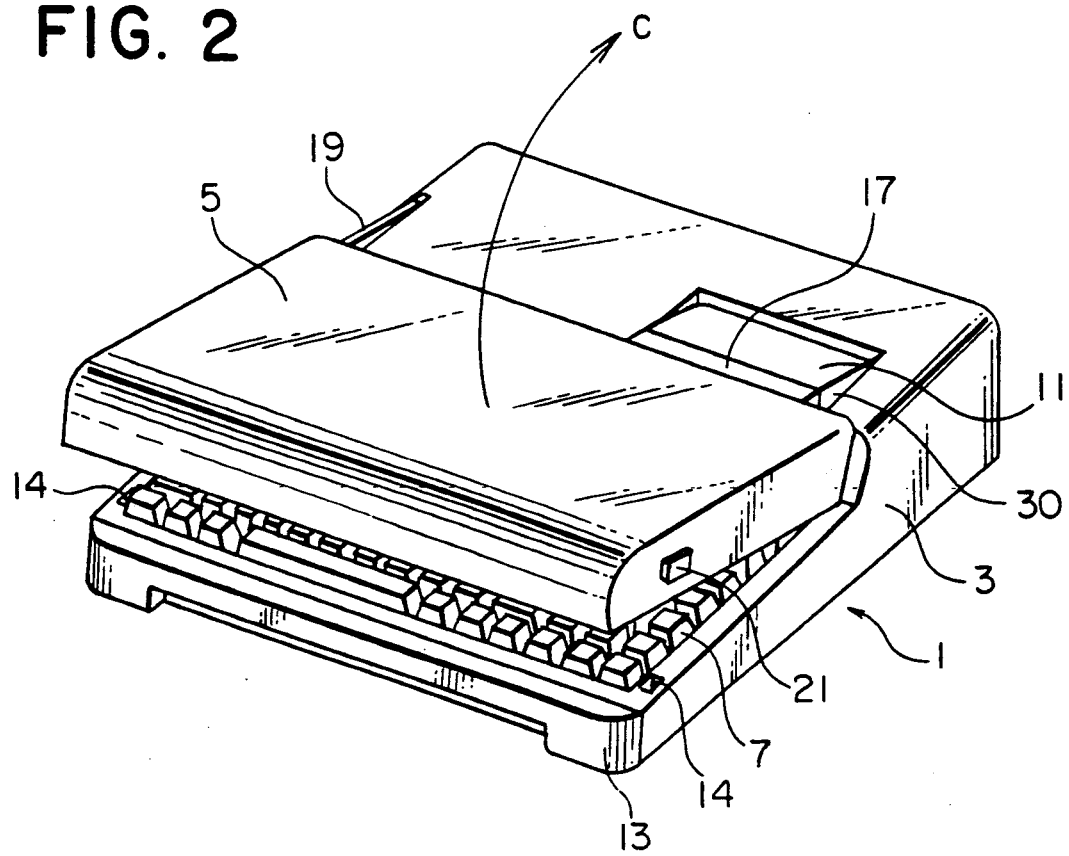
FIG. 2 is a perspective view showing the display unit of the portable computer hopped up to a certain position due to a latch of display unit is released.
Figure 3:
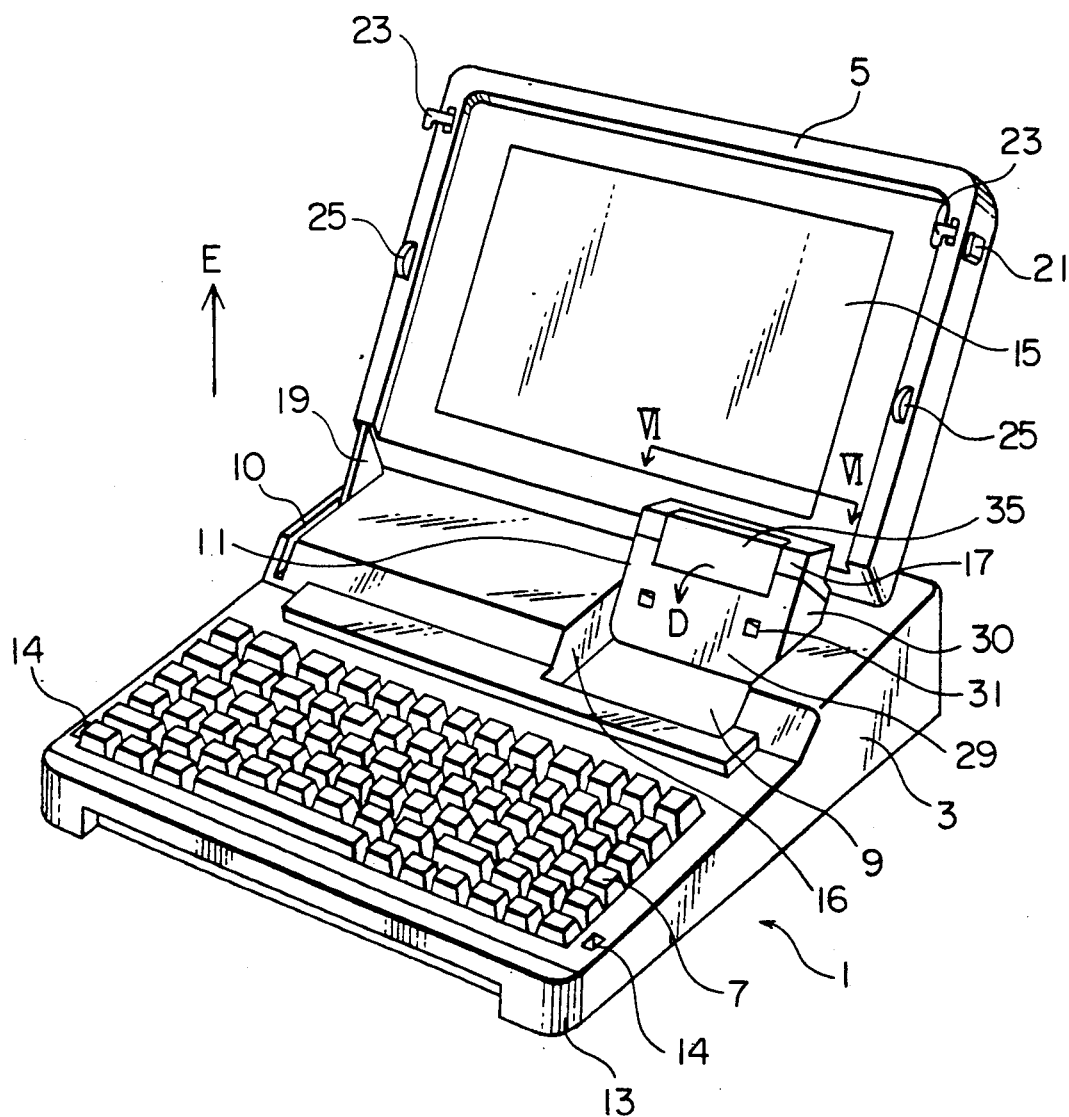
FIG. 3 is a perspective view showing the display unit of the portable computer set to the second position allowing the keyboard operation on watching a display.
Figure 4:
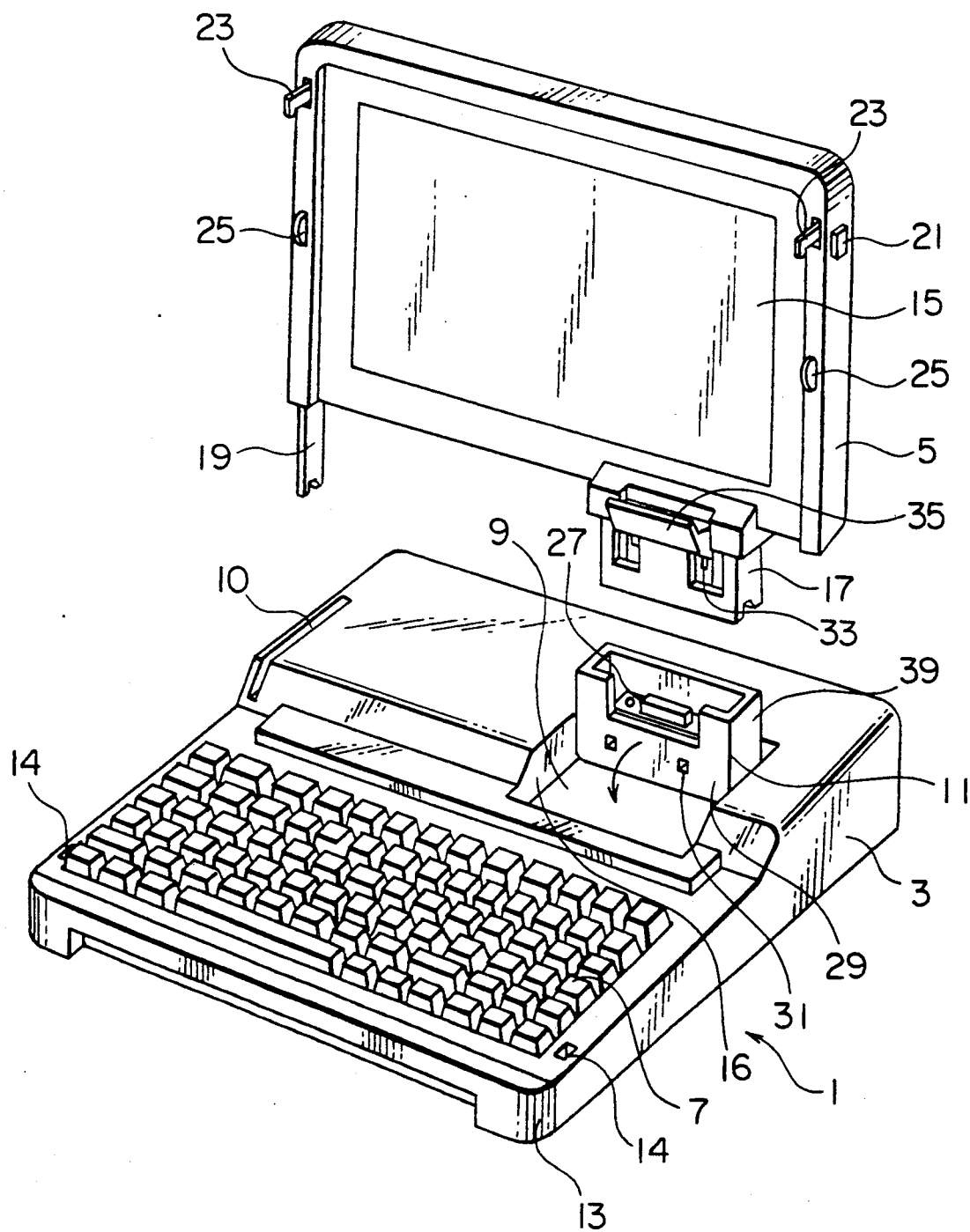
FIG. 4 is a perspective view showing the display unit of the portable computer removed from a socket.
Figure 5:
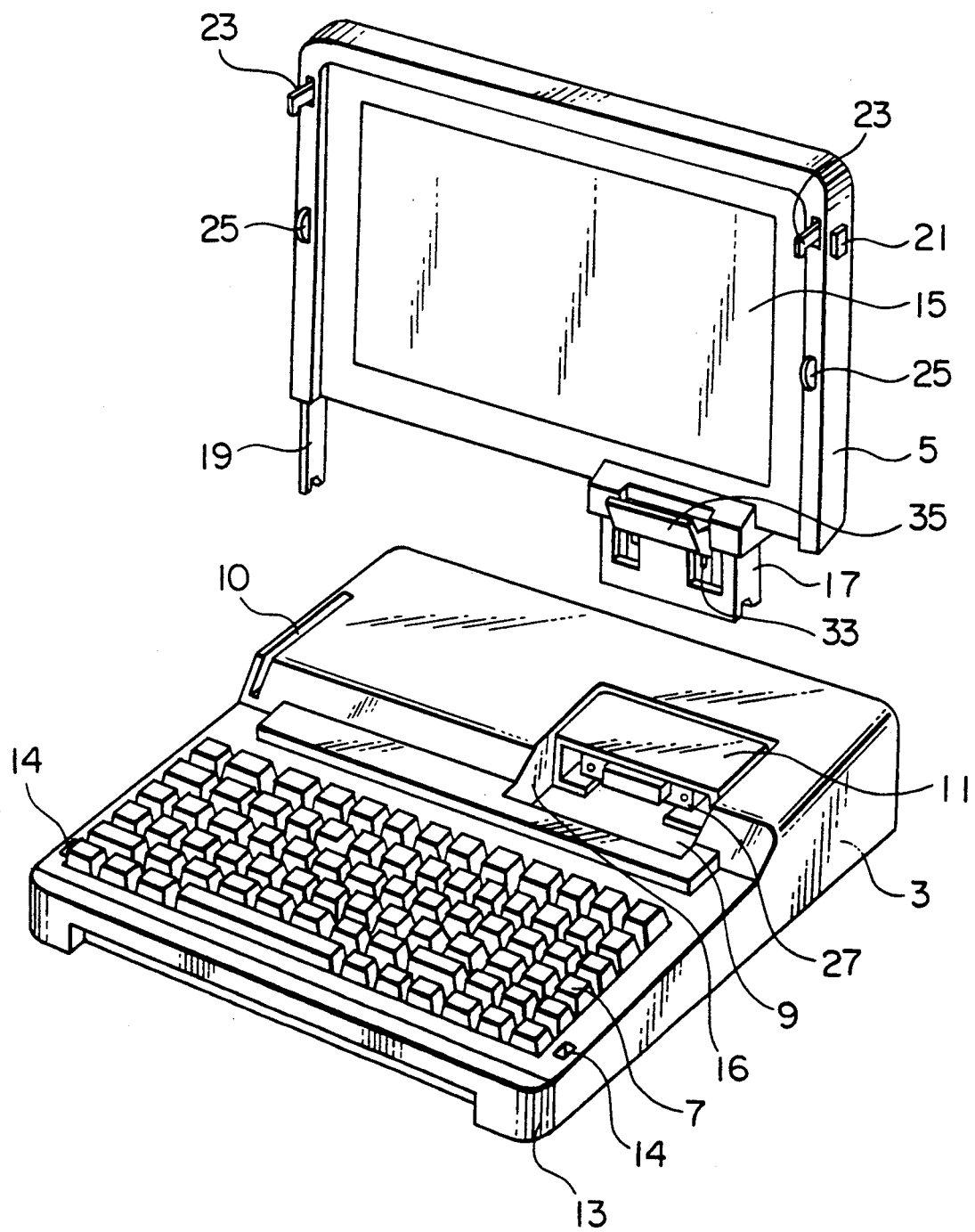
FIG. 5 is a perspective view showing a front phase of the portable computer set to the third position opposing to the socket mount phase when the display unit is removed from the socket.

FIGS. 1 through 5 are perspective views showing the portable computer according to an embodiment of the present invention. FIG. 1 is a perspective view showing a display unit set to the first position for covering a keyboard, FIG. 2 is a perspective view showing the display unit hopped up to a certain position, FIG. 3 is a perspective view showing the display unit set to the second position allowing the keyboard operation on watching the display, FIG. 4 is a perspective view showing the display unit removed from a socket and FIG. 5 is a perspective view showing a front surface of the socket set to the third position opposing to a socket mount surface when the display unit is removed from the socket.

The portable computer 1 is equipped with the base body 3 and the display unit 5. The base body 3 has the keyboard 7 in its front portion. The base body 3 has a rear portion formed therein the socket mount phase 9 and a groove 10. The socket 11 is rotatably attached in the base body 3 on the socket mount surface 9. The base body 3 has the front surface 12 and a handle 13 fixed slidably between the position contacting with the front surface 12 and the position distanced from the front surface 12. The handle 13 is used for carrying the portable computer 1. The base body 3 has a pair of latch grooves 14 formed in both sides of the keyboard 7. The base body 3 is formed with a pair of inner side surfaces 16. Each inner side surface 16 is formed with a circular hole as described later.

The display unit 5 has a display 15 in its inner portion. The display unit 5 is equipped with an engage leg 17 for being engaged with the socket 11 in its bottom end and a auxiliary leg 19 engaged with the base body 3 in the groove 10. On both sides of the display unit 5, a slide switch 21 is provided. On both sides of the display of the display unit 5, a pair of latch hooks 23 for interlocking the slide switch 21 and for engaging respectively with the latch groove 14 are provided. On both sides of the display of the display unit 5, an auxiliary spring 25 for supporting the hop-up operation of the display unit 5 is provided.

The socket 11 is provided with a connector 27 in the base body side in the interior thereof. The socket 11 has a pair of side surface 30 corresponding to the front surface 29. The front surface 29 is provided with a pair of latch holes 31. Each side surface is equipped with a cylindrical boss engaging with the circular hole formed in the inner surface 16 as described later. The engage leg 17 has the engage hook 33 each engaging with a latch hole 31 and a release lever 35 for releasing the engagement between the socket 11 and the engage leg 17 by moving the engage hook 33.

The operation of the portable computer will be explained hereinafter.

As shown in FIG. 1, when the display unit 5 is set to the first position where the keyboard 7 covers the display unit 5 by the action of operator, the latch hook 23 is inserted to engage with the latch groove 14, thereby the display unit 5 is fixed with the base body 3 to cover the keyboard 7. In the first position, the coil spring (described later) of the shaft lock mechanism is formed to have larger diameter than usual, thereby the force acting to lift up the display unit 5 in the arrow direction A is given to the display unit 5. Also the auxiliary spring 25 gives the force acting to lift up the display unit 5 in the arrow direction A to the display unit 5 in the first position. The force acting to lift up the display unit 5 in the arrow direction A which is generated by the coil spring of the shaft lock mechanism is directly given to the engage leg 17, and the socket 11 is given indirectly this force through the engage leg 17. In the condition of FIG. 1, the handle 13 is set to the distanced position to the front phase 12 to facilitate the carry of the portable computer 1.

When the slide switch 21 is slided in the arrow direction B by the action of operator under the condition that the display unit 5 is fixed in the first position, the latch between the latch hook 23 and the latch groove 14 is released. When the latch between the latch hook 23 and the latch groove 14 is released, the display unit 5 and the socket 11 are lifted up in the arrow direction A by the operation of the coil spring and the auxiliary spring 25. The display unit 5 and the socket 11 lifted up in the arrow direction A are stopped at the position where the force of the coil spring and the auxiliary spring 25 and the weight of display unit are balancing as shown in FIG. 2. In FIG. 2, the handle 13 is set to the position contacting with the front phase 12 to avoid to be in the way of the keyboard operation.

In the condition of FIG. 2, the display unit 5 is rotated in the arrow direction C by the action of operator, then the display unit 5 is set to the second position shown in FIG. 3 to allow the operation of the keyboard 7 on watching the display 15, thereby the portable computer 1 is ready to operate.

For removing the display unit 5 from the base body 3, the release lever 35 is pulled to the arrow direction D by the operator, thereby the engagement between the latch hole 31 and the engage hook 33 is released. When the display unit 5 is pulled up to the arrow direction E by the action of operator after the engagement between the latch hole 31 and the engage hook 33 is released, the display unit 5 can be removed from the base body 3 as shown in FIG. 4.

In the condition of FIG. 4, since the engage leg 17 is removed, the socket 11 is not affected by the force of the coil spring of shaft lock mechanism. Therefore, when the socket 11 is rotated in the arrow direction F by the action of operator, the socket 11 is set to the third position where the socket mount phase 9 is opposing to the front phase 29, as shown in FIG. 5.

Figure 6:
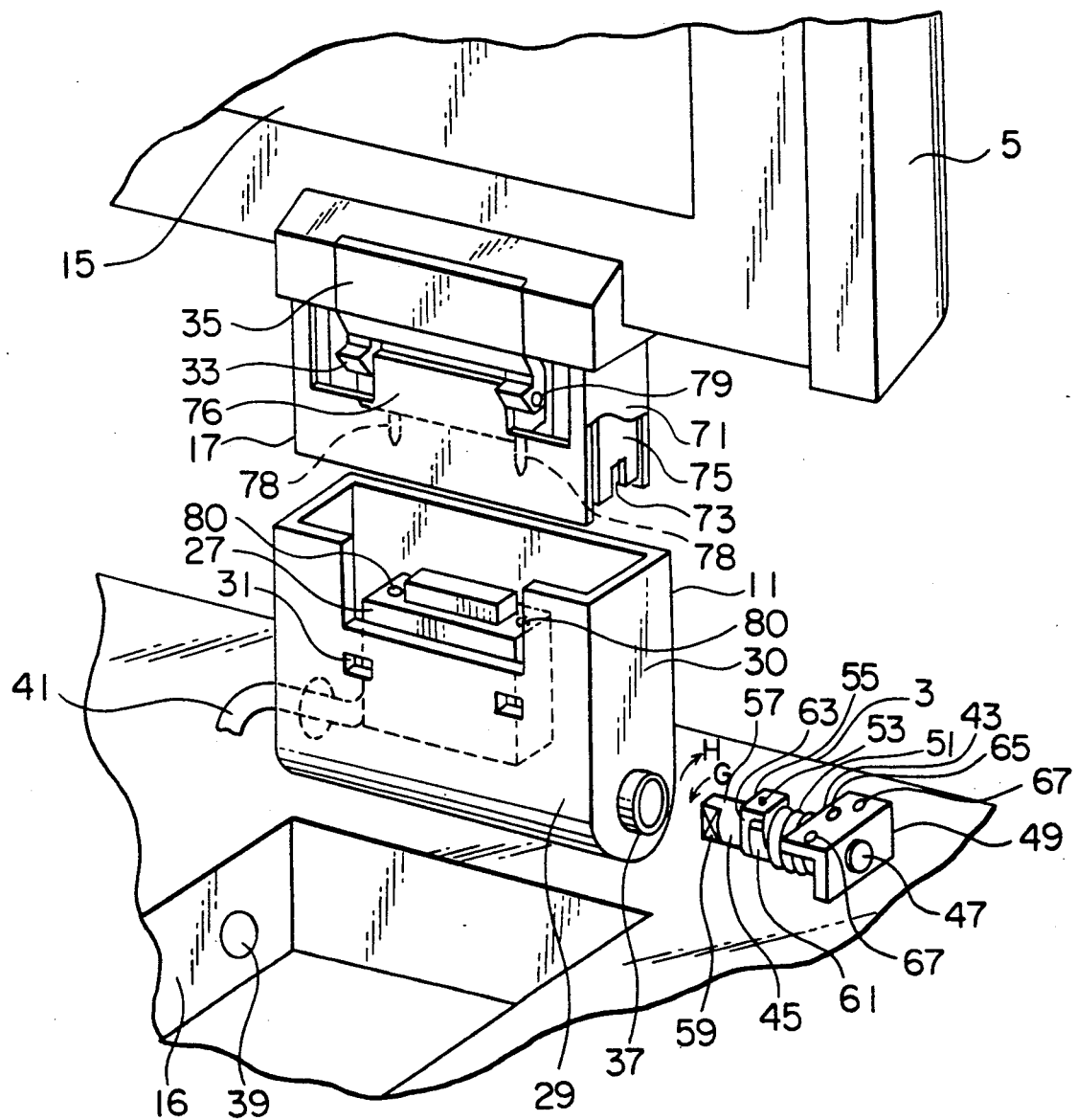
FIG. 6 is an enlarged view for explaining the relation between an engaged leg, the socket and a shaft lock mechanism.
Figure 7:
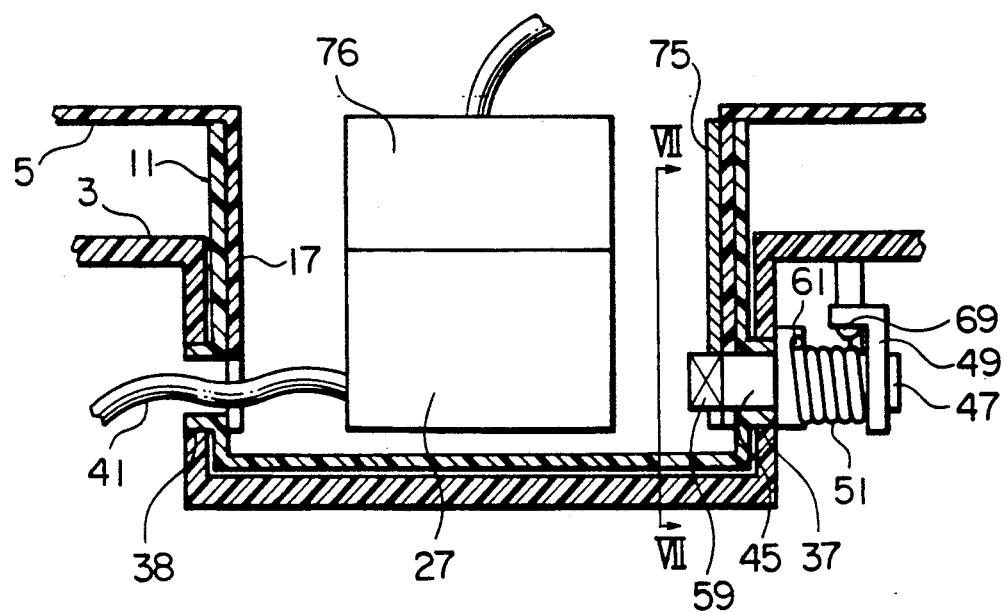
FIG. 7 is a partially sectional view showing the portion of VI—VI in FIG. 3.
Figure 8:
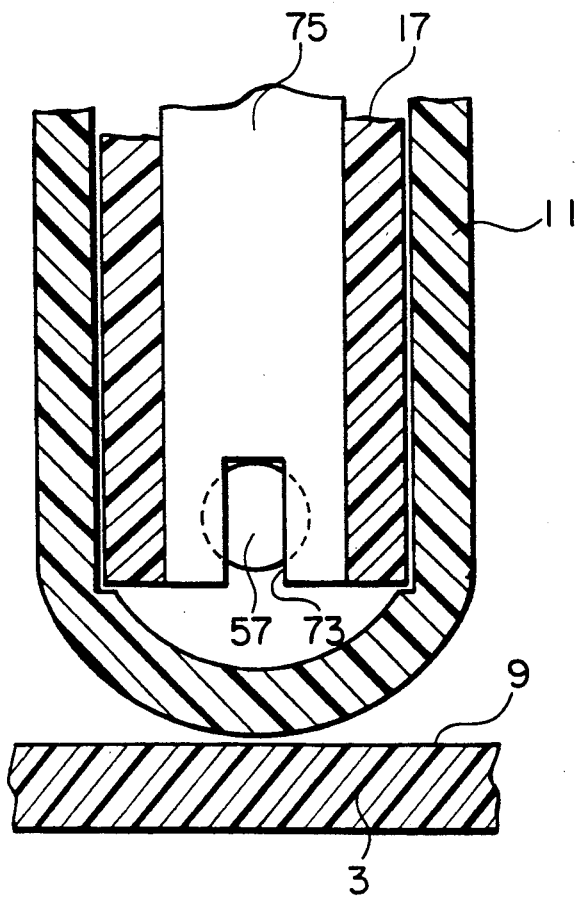
FIG. 8 is a cross sectional view showing the portion of VII—VII in FIG. 7.

Next, the relation regarding the engage leg 17 of the display unit 5, the socket 11 and the shaft lock mechanism will be explained. FIG. 6 is a view for explaining the relation of the engage leg 17, the socket 11 and the shaft lock mechanism, FIG. 7 is a partial cross sectional view showing the portion of VI—VI in FIG. 3, and FIG. 8 is a cross sectional view showing the portion of VII—VII in FIG. 7.

As described above, each side phase 30 of the socket 11 is provided with the cylindrical boss 37 and 38, and each inner side phase 16 is provided with the circular hole 39. The socket 11 is allowed to be rotatable when the cylindrical boss 38 and 39 are engaged with each of the circular hole 39. A cable 41 connected to the connector 27 on the base body side of the socket 11 is connected to the circuits and the power source provided in the base body 3 through the inner portion of the cylindrical boss 38 engaged with one of the circular hole 39.

The shaft lock mechanism 43 described above is fixed near by the other circular hole 39 in the base body 3 The shaft lock mechanism 43 is provided with a rotation shaft 45, a shaft holder 49 for holding rotatably one end portion 47 of the rotation shaft 45, a coil spring 51 rigidly wound around the rotation shaft 45, and a rotation arm 55 fixed with the rotation shaft 45 by means of a pin 53. The other end portion 57 of the rotation shaft 45 has a flat surface 59. One end portion 61 of the coil spring 51 is contacting with the side phase 63 of the rotation arm 55, and the other end portion 65 is fixed with the shaft holder 49. When the rotation arm 55 rotates in the arrow direction G, one end portion 61 of the coil spring 51 is pushed by the side phase 63 of the rotation arm 55, thereby the diameter of the coil spring 51 becomes larger. When the rotation arm 55 rotates in the arrow direction H, the side phase 63 of the rotation arm 55 separates from one end portion 61 of the coil spring 51, thereby the coil spring 51 is returned to the usual condition to fasten strongly the rotation shaft 45. The shaft lock mechanism 43 is fixed with the base body 3 by inserting a screw 69 into a pair of screw holes 67.

The other end portion 57 of the rotation shaft 45 projects into the inner portion of the socket 11 through the cylindrical boss 37 of the socket 11 engaged with the other circular hole 39 of the inner side surface 16. The engage leg 17 is provided with an engage plate 75 having an engage groove 73 for engaging with the flat surface 59 projecting into the socket 11 in the rotation shaft 45 in the side surface 71 therein.

The engage leg 17 has a connector 76 therein at the display side. The connector 76 at the display side is provided with a pair of guide pins 78. The connector 27 at the base body side is provided with a guide hole 80 each allowing the guide pin 78 to be inserted thereinto. When the engage leg 17 is inserted into the socket 11, the connector 27 at the base body side is connected to the connector 76 at the display side by being guided with the guide pin 78 and the guide hole 80.

As shown in FIG. 8, when the engage leg 17 is inserted into the socket 11, the engage groove 73 of the engage plate 75 is engaged with the flat surface 59 of rotation shaft 45. By engaging the engage groove 73 with the flat surface 59, the rotation motion of the flat panel display unit is transmitted to the shaft lock mechanism 43. When the display unit 5 is rotated from the position shown in FIG. 3 to the position shown in FIG. 1 by the action of operator, the rotation shaft 45 rotates in the arrow direction G in FIG. 6 by engaging the engage groove 73 with the flat phase 59. When the rotation shaft 45 is rotated in the arrow direction G, the rotation arm 55 fixed to the rotation shaft 45 is interlocked the rotation shaft 45 by means of the pin 53. When the rotation arm 45 rotates in the arrow direction G, one end portion 61 of the coil spring 51 is rotated in the arrow direction G, thereby the diameter of the coil spring is formed larger than usual. When the diameter of the coil spring 51 becomes larger, the coil spring 51 acts to reform its diameter as the usual condition. The force generated by this action is the force for hopping up the display unit 5 from the position shown in FIG. 1 to the position shown in FIG. 2. When the display unit 5 is rotated from the position shown in FIG. 1 to the position shown in FIG. 3, the rotation shaft 45 rotates in the arrow direction H in FIG. 6 by engaging the engage groove 73 with the flat surface 59. When the rotation shaft 45 is rotated in the arrow direction H, the rotation arm 55 rotates in the arrow direction H, thereby one end portion 61 of the coil spring 51 separates from the rotation arm 55. When one end portion 61 of the coil spring 51 is separated from the rotation arm 55, the coil spring 51 fastens strongly the rotation shaft 45. When the rotation shaft 45 is strongly fastened by the coil spring 51, the rotation shaft 45 is locked. When the rotation shaft 45 is locked, the rotation of the display unit by its own weight is controlled through the flat surface 59 and the engage plate 75. The locking force of the rotation shaft 45 by the coil spring 51 is smaller than the rotation force of the display unit 5 by the action of operator, thereby the display unit 5 can be fixed at a certain angle near by the position shown in FIG. 3 by the operator.

Figure 9:
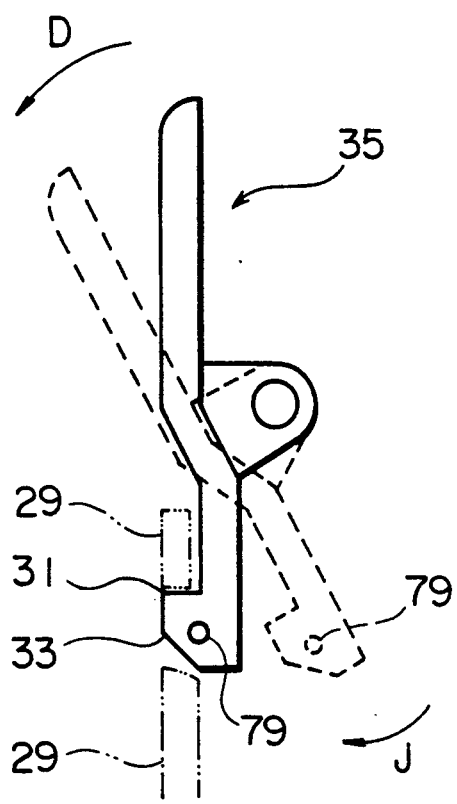
FIG. 9 is a view for explaining the operation of a release lever.

FIG. 9 is a view for explaining an operation of the release lever 35 when the display unit 5 is removed from the socket 11. The release lever 35 is formed to be rotatably centering a rotation shaft 77 fixed in the engage leg 17. The release lever 35 is continuously affected by the force in the arrow direction J by means of a spring (not shown). One end portion of the release lever 35 has the engage hook 33. The engage hook 33 is engaged with the latch hole 31 formed on the front phase 29 of the socket 11 when the engage leg 17 is set in the socket 11 to fix the display unit 5 with the socket 11. Both sides of the engage hook 33 of the release lever 35 have projections 79. For removing the engage leg 17 from the socket 11, the release lever 35 is rotated in the arrow direction D by the action of operator. When the release lever 35 is set to the position shown by the dotted lines in FIG. 9, the projection 79 is engaged with a concave portion formed in the engage leg 17 to fix the release lever 35. When the display unit 5 is pulled up in the arrow direction E in FIG. 3 in this condition, the display unit 5 can be removed from the base body 3.

As shown in FIG. 4, when the display unit 5 is removed from the base body 3, the flat surface 59 of the rotation shaft projecting into the socket 11 becomes free. The socket 11 is only rotatably mounted on the base body 3 on inserting the cylindrical boss 37 into the circular hole 39. Rotating only the socket 11 is not affected to rotate the rotation shaft 45. Therefore, it is not affected by the force of coil spring 51 if the socket 11 is rotated in the arrow direction F in FIG. 4, thereby the socket 11 can be set to the position where the front surface 29 is opposing to the socket mount phase 9, as shown in FIG. 9.

Figure 10:
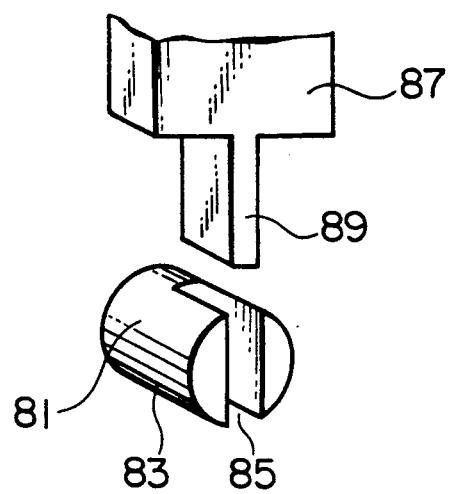
FIGS. 10 and 11 are views for explaining other embodiments of the shaft lock mechanism.
Figure 11:
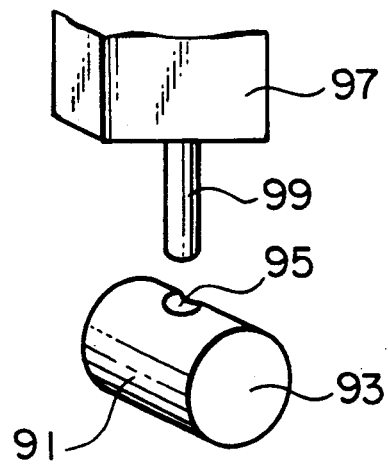

In the present embodiments, other end portion 57 of the rotation shaft 45 is formed as a flat plate having the flat surface 59 and the top end of the engage plate 75 is formed as a hook type engage groove 73. However, the present invention is not limited only to these structures. As shown in FIG. 10, the structure in which an engage groove 85 is provided in one end portion of a rotation shaft 81 and an engage piece 89 insertable into the engage groove 85 is provided at the top end of an engage plate 87 is applicable to the present invention. Further as shown in FIG. 11, the structure in which an engage hole 95 is provided in one end portion 93 of a rotation shaft 91 and an engage pin 99 insertable into an engage hole 95 is provided at the top end portion of an engage plate 97 is also applicable to the present invention.

What is claimed is:

1. A portable apparatus comprising:
   a base unit including a front portion having a keyboard and a rear portion having a socket mounting surface;
   a socket mounted on the socket mounting surface and being rotatable between a first socket position for covering the socket mounting surface and a second socket position for exposing the socket mounting surface, the socket having an attaching portion;
   a display unit having a display and a leg portion removably attached to the socket attaching portion, the display unit being rotatable between a closed position for covering the keyboard and an open position for viewing the display whenever the leg portion is attached to the socket attaching portion;
   biasing means fixed to the base unit for generating a biasing force for urging the display unit toward the open position whenever the display unit is in the closed position, the biasing means transmitting the biasing force directly to the leg portion and indirectly to the socket through the leg portion whereby the biasing force acting on the socket is released whenever the leg portion is removed from the socket and the socket is freely rotatable between the first socket position and the second position.

2. A portable apparatus according to claim 1, wherein the base unit further includes a rear top surface which is higher than the socket mounting surface and the socket further includes a rear surface which is flush with the rear top surface whenever the socket is in the first position.

3. A portable apparatus comprising:
   a base unit including a front upper surface and a rear portion having a socket attaching portion, a socket storing surface and a shaft attaching portion;

a socket attached to the socket attaching portion, the socket including an inner portion and a side wall having a socket shaft hole;

a shaft device including a rotational shaft having a first end, a middle portion, a second end having a first engaging portion, and a shaft supporter fixed to the shaft attaching portion so as to pivotally support the first end such that the second end projects into the socket inner portion and the middle portion is in pivotal supporting contact with the socket shaft hole;

a display unit including a display and a leg removably attached to the socket inner portion, the leg having a second engaging portion engaging the first engaging portion whenever the leg is disposed within the socket inner portion, the display being rotatable between a closed position for covering the front upper surface and an open position for viewing the display, the rotation of the display unit causing rotation of the rotational shaft; and a coil spring wound around the rotational shaft so as to generate a biasing force for biasing the display unit toward the open position whenever the display unit is in the closed position, the biasing force being applied directly to the leg through the rotational shaft and indirectly to the socket through the leg portion.

4. A portable apparatus according to claim 3, wherein whenever the leg portion is removed from the socket, the middle portion freely supports the socket and the socket is freely rotatable between a first socket position for covering the socket storing surface and a second socket position for exposing the socket storing surface.

5. A portable apparatus comprising:
- a base unit including a front portion having a keyboard and a rear portion having a socket storing surface an a socket attaching portion;
- a socket pivotally attached to the socket attaching portion;
- a display unit including a leg portion removably attached to the socket, the display unit being rotatable between a closed position for covering the keyboard and an open position for operating the apparatus when the leg portion is attached to the socket;
- a biasing means connected to the base unit for generating a biasing force for biasing the display unit toward the open position; and
- transmitting means for directly transmitting the biasing force to the leg portion and indirectly transmitting the biasing force to the socket through the leg portion when the leg portion is attached to the socket, the biasing force acting on the socket being released by removing the leg portion from the socket.

* * * * *